US008616187B2

(12) United States Patent
Yamazaki et al.

(10) Patent No.: US 8,616,187 B2
(45) Date of Patent: Dec. 31, 2013

(54) WASTE HEAT RECOVERING AND COOLING APPARATUS FOR ENGINE

(75) Inventors: Yoshinobu Yamazaki, Tokyo (JP);
Suguru Matsumoto, Tokyo (JP);
Junichi Toyoda, Tokyo (JP); Shinya Kurasawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 196 days.

(21) Appl. No.: 13/226,859

(22) Filed: Sep. 7, 2011

(65) Prior Publication Data
US 2012/0067545 A1    Mar. 22, 2012

(30) Foreign Application Priority Data

Sep. 17, 2010   (JP) ................................. 2010-209106

(51) Int. Cl.
*F02M 25/07* (2006.01)
*F02B 47/08* (2006.01)

(52) U.S. Cl.
USPC ..................................... 123/568.12; 701/108

(58) Field of Classification Search
USPC ........... 123/568.12, 568.11, 542, 41.01, 41.1, 123/41.14, 41.33; 701/108; 165/52, 103
See application file for complete search history.

(56) References Cited

U.S. PATENT DOCUMENTS

| 6,772,715 | B2 * | 8/2004 | Pfeffinger et al. | 123/41.31 |
| 6,915,763 | B2 | 7/2005 | Arisawa et al. | |
| 2004/0216700 | A1 * | 11/2004 | Hutchins | 123/41.08 |
| 2006/0254291 | A1 * | 11/2006 | Allen et al. | 62/179 |
| 2007/0272174 | A1 * | 11/2007 | Szalony et al. | 123/41.14 |
| 2008/0276886 | A1 * | 11/2008 | Tsuji et al. | 123/41.1 |
| 2009/0078220 | A1 * | 3/2009 | Meyer et al. | 123/41.31 |

FOREIGN PATENT DOCUMENTS

| JP | 2004-301061 | 10/2004 |
| JP | 2005-83225 | 3/2005 |

* cited by examiner

*Primary Examiner* — Mahmoud Gimie
(74) *Attorney, Agent, or Firm* — Smith, Gambrell & Russell, LLP

(57) ABSTRACT

A waste heat recovering and cooling apparatus for an engine includes a water pump that ejects cooling water of an engine; an EGR cooler that cools EGR gas introduced into an intake pipe from an exhaust pipe of the engine by using some of the cooling water ejected from the water pump; an EGR valve that opens and closes the channel of the EGR gas passing through the EGR cooler; and a transmission warmer that heats lubricating oil of a transmission by the cooling water passing through the EGR cooler.

15 Claims, 7 Drawing Sheets

WASTE HEAT RECOVERING AND COOLING APPARATUS FOR ENGINE

CROSS-REFERENCE TO RELATED APPLICATIONS

The present application claims priority from Japanese Patent Application No. 2010-209106 filed on Sep. 17, 2010, the entire contents of which are hereby incorporated by reference.

BACKGROUND OF THE INVENTION

1. Field of the Invention

The present invention relates to an engine waste heat recovering and cooling apparatus mounted on a vehicle, and more particularly to the one that improves fuel efficiency of a vehicle with a simple configuration.

2. Description of the Related Art

A water-cooled internal combustion engine mounted on a vehicle such as an automobile has a cooling water channel, in which cooling water is circulated, around a combustion chamber or a cylinder. The cooling water is also circulated to a radiator to cool the cooling water by a heat exchange with a relative wind.

This cooling water is also passed through a heater core for warming a vehicle compartment.

There has been proposed a system of utilizing waste heat of an engine recovered by cooling water in order to enhance a fuel efficiency of a vehicle.

For example, Japanese Patent Application Laid-Open (JP-A) No. 2005-83225 describes that the temperature of transmission oil is increased by utilizing the temperature of cooling water of an engine in order to reduce a viscosity of the transmission oil, which reduces a friction loss so as to enhance fuel economy and switching operability.

In the technique described in JP-A No. 2005-83225, the cooling water passes through an engine body and a heater core for warming, and then, is introduced into an oil temperature adjusting unit of the transmission oil through a channel changeover valve.

JP-A No. 2004-301061 describes that, in order to promote warming upon a restart of an engine, cooling water is warmed in a storage tank, which is a heat storage container, and a cooling water channel is switched by a rotary three-way valve.

In the technique described in JP-A No. 2005-83225, the transmission oil can be heated only after a large volume of cooling water, circulating in the engine, the heater core, and the cooling water channel that communicates these units, is completely heated. Therefore, it takes a long time from the start of the engine to the start of heating the transmission oil, whereby it is difficult to improve fuel economy immediately after the start of driving the vehicle.

If the heat storage container described in JP-A No. 2004-301061 is added to the oil temperature adjusting unit described above, the transmission oil can be heated to enhance fuel economy immediately after the start of driving the vehicle. However, in this case, a heat storage container, a switching valve, and a peripheral water channel has to be provided, which presents a problem with mounting space, cost, and weight.

SUMMARY OF THE INVENTION

The present invention aims to provide a waste heat recovering and cooling apparatus for an engine that utilizes waste heat of an engine so as to enhance fuel economy of a vehicle with a simple configuration.

The present invention solves the above-mentioned problem by means described below.

A waste heat recovering and cooling apparatus for an engine according to an aspect of the present invention includes: a water pump that ejects cooling water of an engine; an EGR cooler that cools EGR gas introduced into an intake pipe from an exhaust pipe of the engine by using some of the cooling water ejected from the water pump; an EGR valve that opens and closes the channel of the EGR gas passing through the EGR cooler; and a transmission warmer that heats lubricating oil of a transmission by the cooling water passing through the EGR cooler.

The waste heat recovering and cooling apparatus for an engine preferably includes a blocking unit that blocks the water channel of the cooling water passing through the EGR cooler and the transmission warmer; and a control unit that controls the blocking unit and the EGR valve.

In the waste heat recovering and cooling apparatus for an engine, it is preferable that the control unit open the EGR valve and bring the blocking unit into a blocking state when the engine is in a predetermined warm-up state.

In the waste heat recovering and cooling apparatus for an engine, it is preferable that the control unit open the EGR valve and bring the blocking unit into an open state when the engine is in a predetermined warm-up end state.

In the waste heat recovering and cooling apparatus for an engine, it is preferable that the control unit close the EGR valve and bring the blocking unit into an open state, when the transmission is in a predetermined high-temperature state.

In the waste heat recovering and cooling apparatus for an engine, it is preferable that the blocking unit be a three-way valve that is connected to a pipe at an exit of the transmission warmer, a main cooling water channel of the engine, and a pipe at an inlet of the heater core used for warming a vehicle compartment, and that the control unit close the EGR valve, allow the three-way valve to communicate the main cooling water channel of the engine and the heater core with each other, and block the water channel of the cooling water passing through the EGR cooler and the transmission warmer, when a heating command is input from a user or upon a predetermined low-temperature state.

The effects described below can be acquired by the present invention.

(1) A cooling water supplied to the transmission warmer is heated by an exhaust gas (EGR gas), which has a high temperature, compared to the temperature of the engine body, at a relatively early stage immediately after the start, whereby the temperature of the lubricating oil of the transmission can be increased at an early stage, and the friction loss in the transmission can be reduced. Accordingly, the fuel efficiency of a vehicle can be enhanced.

The cooling water is heated by utilizing waste heat recovered from the existing EGR cooler without providing a heat storage container storing the cooling water, for example. Therefore, the above-mentioned effect can be attained with a simple configuration.

(2) The blocking unit for blocking the water channel of the cooling water passing through the EGR cooler and the transmission warmer is provided, whereby the temperature of the cooling water accumulated in the transmission warmer from the EGR cooler is increased at an early stage. This cooling water having a high temperature is stored, whereby the temperature of the lubricating oil of the transmission can be increased at an early stage.

(3) When the engine is in the predetermined warm-up state (cold state), the EGR valve is opened, and the blocking unit is brought into the blocking state. Therefore, the temperature of the cooling water accumulated in the transmission warmer from the EGR cooler is increased at an early stage by the EGR gas, and the cooling water is stored in the high-temperature state, so as to be capable of being prepared for the warm-up of the transmission after the warm-up of the engine.

The substantial volume of the cooling water is reduced to give priority to the early warm-up of the engine, whereby the improvement in fuel economy due to the reduction in the friction loss of the engine can be achieved.

(4) When the engine is in the predetermined warm-up end state (warm state), the EGR valve is opened, and the blocking unit is brought into the open state. Therefore, the cooling water, whose temperature is increased by the recovery of the waste heat at the EGR cooler, is passed through the transmission warmer so as to increase the temperature of the lubricating oil, whereby the warm-up effect of the transmission can be enhanced.

(5) When the transmission is in the predetermined high-temperature state, the EGR valve is closed, and the blocking unit is brought into the open state. Therefore, the cooling water, whose temperature is low since the waste heat recovery is not performed at the EGR cooler, is passed through the transmission warmer so as to cool the lubricating oil. Accordingly, the transmission can be prevented from overheating.

(6) The blocking unit is a three-way valve that is connected to a pipe at an exit of the transmission warmer, a main cooling water channel of the engine, and a pipe at an inlet of the heater core used for warming of a vehicle compartment, and the control unit closes the EGR valve, allows the three-way valve to communicate the main cooling water channel of the engine and the heater core with each other, and blocks the water channel of the cooling water passing through the EGR cooler and the transmission warmer, when a heating command is input from a user or in a predetermined low-temperature state. Therefore, heat can be prevented from transferring from the transmission warmer to the transmission, the substantial volume of the cooling water is reduced by an amount corresponding to that between the EGR cooler and the transmission warmer, and the combustion temperature of the engine is increased by closing the EGR valve in order to lower the filling efficiency. Therefore, the temperature of the cooling water is maintained be high, whereby satisfactory warming effect can be achieved.

DETAILED DESCRIPTION OF THE PREFERRED EMBODIMENTS

The present invention provides a waste heat recovering and cooling apparatus for an engine that enhances fuel economy of a vehicle by utilizing waste heat of an engine with a simple configuration, wherein cooling water whose temperature is increased by waste heat recovery at an EGR cooler is introduced into a CVT warmer, and transmission oil is heated to lower a viscosity, whereby a loss in transmission torque is reduced.

The present invention utilizes a configuration in which a three-way valve is provided among a pipe at an exit of the CVT warmer, a pipe at an inlet of a heater core, and a water feeding pipe, and a water channel is switched based on an operation state.

Embodiment

An embodiment of the waste heat recovering and cooling apparatus for an engine according to the present invention will be described below.

Figure 1:
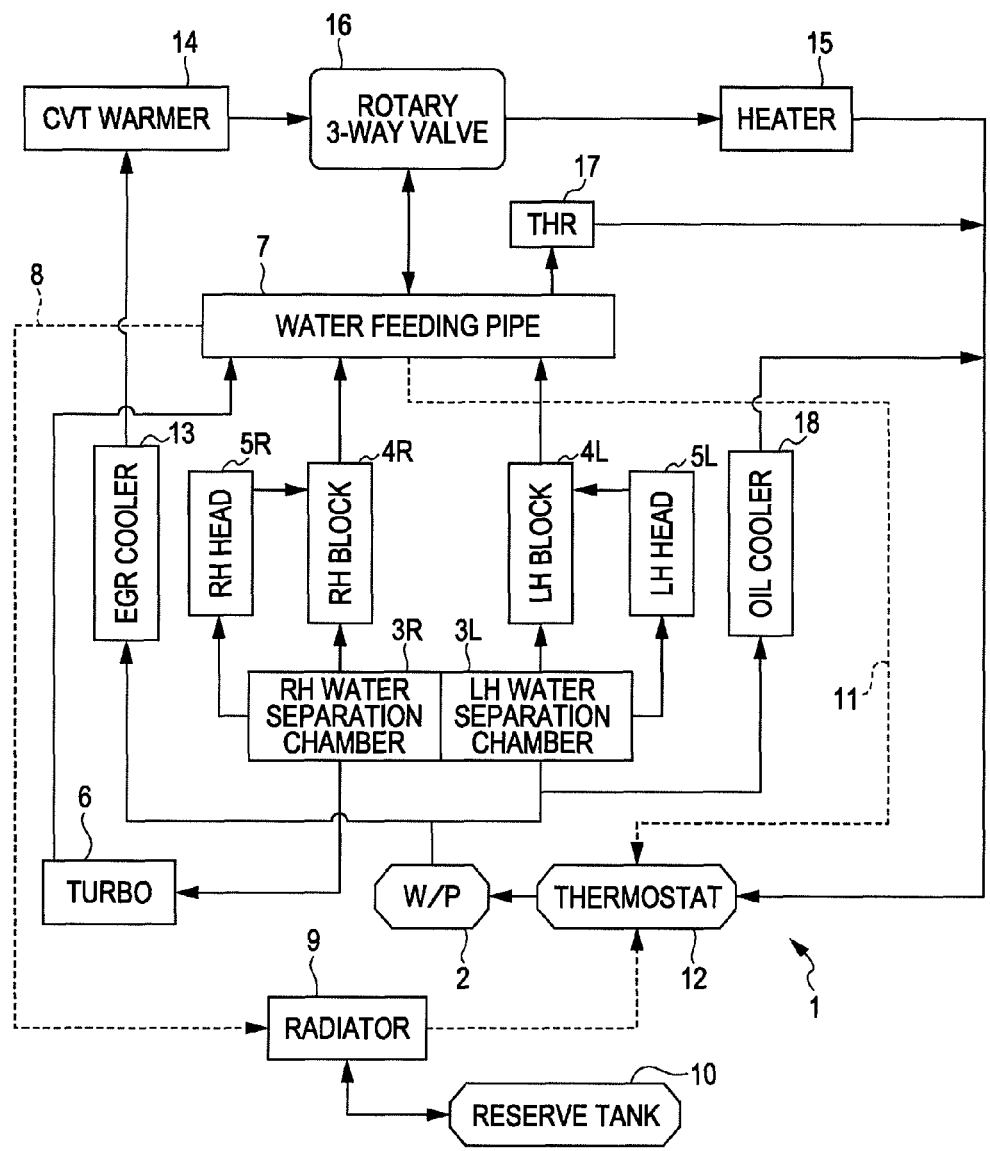
FIG. 1 is a diagram illustrating a configuration of a waste heat recovering and cooling apparatus for an engine, according to an embodiment of the present invention.

FIG. 1 is a diagram illustrating a configuration of the waste heat recovering and cooling apparatus for an engine according to the embodiment. The waste heat recovering and cooling apparatus according to the embodiment is provided to a water-cooling internal combustion engine, such as a diesel engine and a gasoline engine, mounted on a vehicle such as a passenger car as a traveling power source.

The embodiment uses a horizontal opposed engine, which is mounted vertically in a vehicle, and includes a left and right pair of cylinders and heads.

The engine 1 is configured to include a water pump 2, a left-hand (LH) water separation chamber 3L, a right-hand (RH) water separation chamber 3R, an LH block 4L, an RH block 4R, an LH head 5L, an RH head 5R, a turbocharger 6, a water feeding pipe 7, a radiator water channel 8, a radiator 9, a reserve tank 10, a bypass water channel 11, a thermostat 12, an EGR cooler 13, a CVT warmer 14, a heater core 15, a three-way valve 16, a thermal relay 17, and an oil cooler 18.

The water pump 2 is driven by an unillustrated output shaft of the engine 1 so as to eject cooling water. A liquid having nonfreezing property such as a long life coolant (LLC) is used as the cooling water, for example.

The LH water separation chamber 3L and the RH water separation chamber 3R distribute the cooling water fed from the water pump 2 to the left and right blocks and heads respectively.

Each of the LH block 4L and the RH block 4R is formed with a cylinder into which each of left and right pistons is inserted, a cooling water channel for cooling the cylinder, and so forth.

The LH head 5L and the RH head 5R are provided to the LH block 4L and the RH block 4R respectively, and include a combustion chamber, intake and exhaust ports, a valve train, and a fuel injection device, as well as a cooling water channel for cooling the combustion chamber and the exhaust port.

The turbocharger 6 is a supercharger that drives a compressor by a turbine, which is driven by exhaust of the engine 1 so as to compress intake gas of the engine 1.

The LH block 4L, the RH block 4R, the LH head 5L, the RH head 5R, and the turbocharger 6 are cooled by the passage of the cooling water ejected by the water pump 2.

The water feeding pipe 7 is a portion where the cooling water flown from the LH block 4L, the RH block 4R, the LH head 5L, the RH head 5R, and the turbocharger 6 is collected, and constitutes a part of the main cooling water channel of the engine 1.

The radiator water channel 8 feeds the cooling water flown from the water feeding pipe 7 to the radiator 9.

The radiator 9 is a heat exchanger that cools the cooling water fed from the radiator water channel 8 by a heat exchange with a relative wind. The cooling water cooled at the radiator 9 is flown back to the water pump 2.

The reserve tank 10 is an auxiliary tank that is connected to the radiator 9 for temporarily storing surplus cooling water.

The bypass water channel 11 flows back the cooling water from the water feeding pipe 7 to the water pump 2 without passing through the radiator 9.

The thermostat 12 selectively introduces the cooling water from the pipe at the exit of the radiator 9 and the bypass water channel 11 to the water pump 2 depending on the temperature of the cooling water.

When the temperature of the cooling water is low, the thermostat 12 blocks the water channel from the radiator 9. In this case, the cooling water from the water feeding pipe 7 is returned to the water pump 2 from the bypass water channel 11. When the temperature of the cooling water is higher than a predetermined temperature, the thermostat 12 opens the water channel from the radiator 9 to allow the cooling water passing through the radiator 9 to return to the water pump 2.

The EGR cooler 13 cools an EGR gas, which extracts some exhaust of the engine 1 and introduces the same into the intake pipe, by the heat exchange with the cooling water ejected from the water pump 2.

As illustrated in FIGS. 3 to 6, the EGR cooler 13 includes an EGR valve 13b that opens and closes an inner EGR gas channel 13a. A cooling water channel 13c is provided around the EGR gas channel. The cooling water channel 13c is provided with an unillustrated water temperature sensor for detecting the temperature of the inner water.

The EGR valve 13b is controlled to be opened and closed by an unillustrated engine control device that controls the engine 1 and accessories thereof in an integrated fashion.

The CVT warmer 14 performs a heat exchange between the cooling water flown from the EGR cooler 13 and transmission oil (CVT fluid) that is a lubricating oil of an unillustrated continuously variable transmission (CVT) increasing or decreasing an output speed o of the engine 1, thereby heating the transmission oil. The CVT warmer 14 is an oil temperature adjusting unit serving also as a cooler for cooling the transmission oil when the CVT is overheated due to a high load.

The heater core 15 is a heat exchanger that performs a heat exchange between the cooling water of the engine 1 and air blown by a blower so as to warm a vehicle compartment.

The pipe at the inlet of the heater core 15 is connected to the water feeding pipe 7 via the three-way valve 16.

The pipe at the exit of the heater core 15 is connected to the thermostat 12, whereby the cooling water flown from the heater core 15 is returned to the water pump 2 via the thermostat 12.

The three-way valve 16 is a rotary valve that is coupled to the pipe at the exit of the CVT warmer 14, the pipe at the inlet of the heater core 15, and the water feeding pipe 7, and switches the channel among them.

The operation of selecting the channel by the three-way valve 16 is controlled by the above-mentioned engine control unit.

The thermal relay 17 is provided on a pipe disposed between the water feeding pipe 7 and the pipe at the exit of the heater core 15 for turning on or off an unillustrated electric fan disposed opposite to the radiator 9 depending on the temperature of the cooling water.

The oil cooler 18 cools the engine oil, which is the lubricating oil of the engine 1, by the cooling water ejected from the water pump 2. The cooling water ejected from the oil cooler 18 is introduced into the pipe at the exit of the heater core 15.

The above-mentioned control of the three-way valve 16 and the EGR valve 13b in the waste heat recovering and cooling apparatus for an engine will be explained below. The engine control device controls the three-way valve 16 and the EGR valve 13b based upon outputs from an unillustrated cooling sensor for detecting the temperature of the cooling water, an unillustrated oil temperature sensor for detecting the temperature of the transmission oil, and an unillustrated heating switch that is turned on or off by a vehicle occupant. The engine control device function as a control unit for controlling the waste heat recovering and cooling apparatus.

Figure 2:
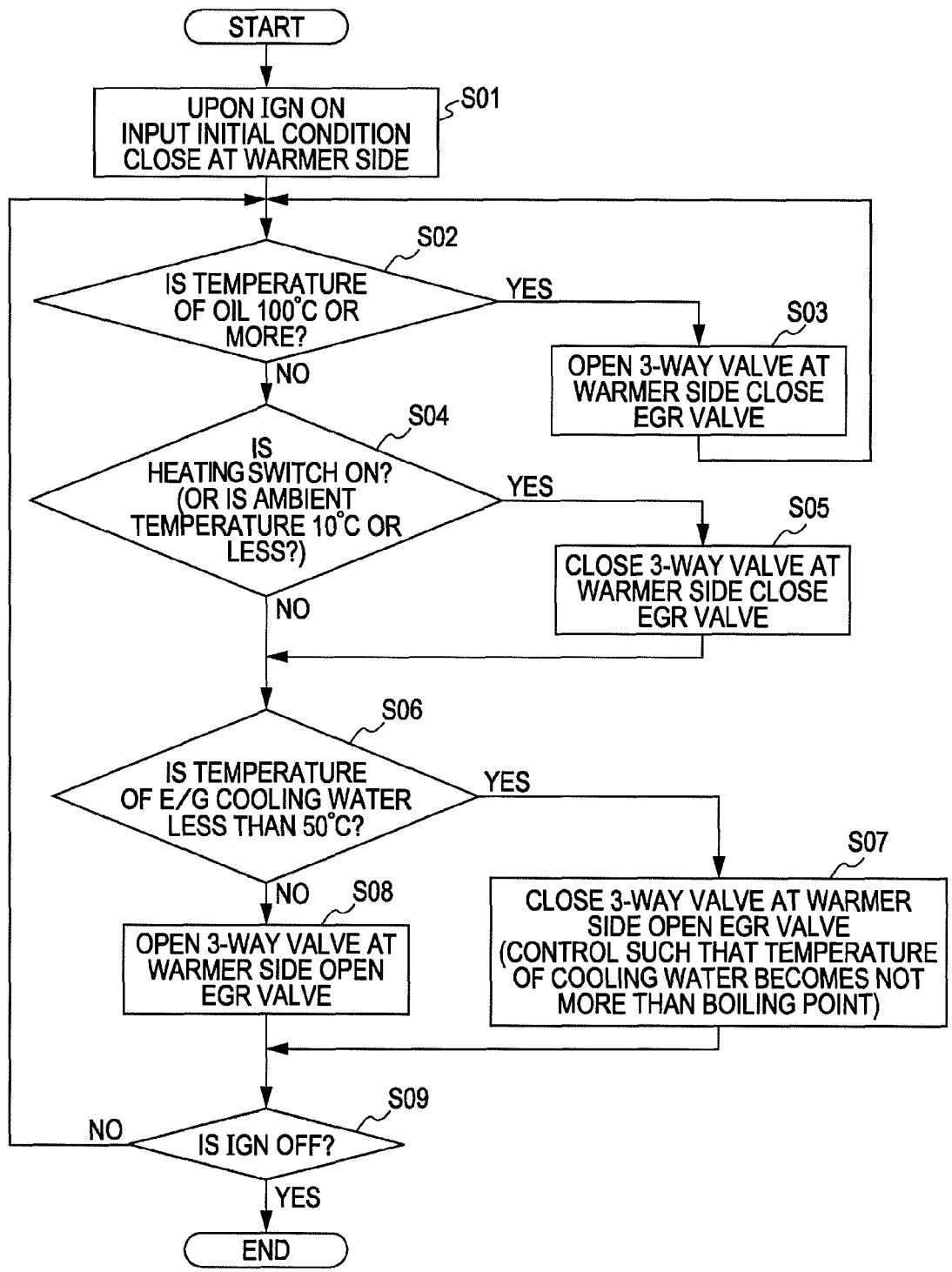
FIG. 2 is a flowchart illustrating a control of a three-way valve and an EGR valve with the waste heat recovering and cooling apparatus for an engine according to the embodiment.

FIG. 2 is a flowchart illustrating this control. The control will be described in order of steps.

Step S01: Input Initial Condition and Close at Warmer Side Upon Ignition (IGN) On The process flow is started when an illustrated ignition switch that starts or stops the engine 1 is turned on.

Firstly, various initial conditions are input to the engine control unit.

The three-way valve 16 is closed at the side of the CVT warmer 14, whereby the cooling water introduced to the three-way valve 16 from the water feeding pipe 7 is flown to the heater core 15.

The engine control unit proceeds to step S02.

Step S02: Determine Temperature of CVT Oil

The engine control unit detects the temperature of the transmission oil of the CVT. When the oil temperature is 100° C. or higher, the engine control unit determines that there is a possibility that the CVT is overheated due to a high load caused by uphill-climbing or towing drive. Then, the engine control unit proceeds to step S03.

Step S03: Open Three-Way Valve at Warmer Side and Close EGR Valve

Figure 3:
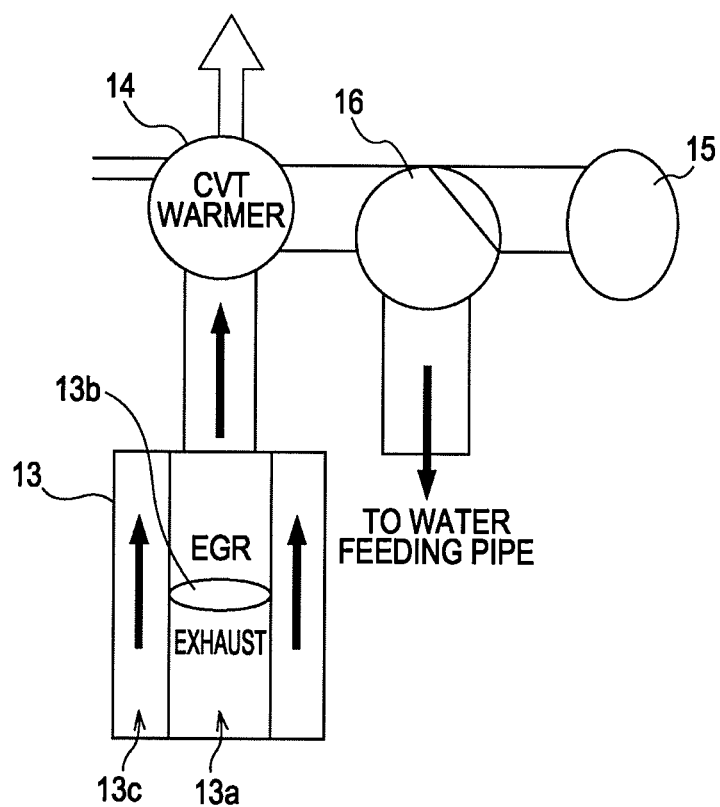
FIG. 3 is a schematic view illustrating the states of the EGR valve and the three-way valve upon a high-load (when CVT oil is in a high-temperature state) with the waste heat recovering and cooling apparatus for an engine according to the embodiment.

As illustrated in FIG. 3, the engine control unit makes the three-way valve 16 flow the cooling water from the CVT warmer 14 to the water feeding pipe 7 and block the flow of the cooling water to the heater core 15.

The engine control unit also closes the EGR valve 13b.

With this process, the cooling water is allowed to pass through the CVT warmer 14, whereby the transmission oil is cooled by the cooling water. Therefore, the CVT can be prevented from overheating.

In this case, the EGR gas is blocked in order not to recover the waste heat at the EGR cooler 13. As a result the temperature of the cooling water introduced into the CVT warmer 14 is maintained low, whereby the temperature of the transmission oil is cooled to or below a reference value at an early stage.

Thereafter, the engine control unit returns to step S02 to repeat the subsequent processes.

Step S04: Determine Whether Heating Switch is Turned On

The engine control unit determines whether the heating switch is turned on or not. When the heating switch is turned on, the engine control unit determines that a heating request is made by a vehicle occupant, and then, proceeds to step S05.

When the heating switch is turned off, on the other hand, the engine control unit proceeds to step S06.

Whether the heating request is made or not may be determined based upon other conditions such as an ambient temperature, instead of on/off of the heating switch. For example, the engine control unit may be configured to proceed to step S05 when the ambient temperature is 10° C. or lower.

Step S05: Close Three-Way Valve at Warmer Side and Close EGR Valve

Figure 4:
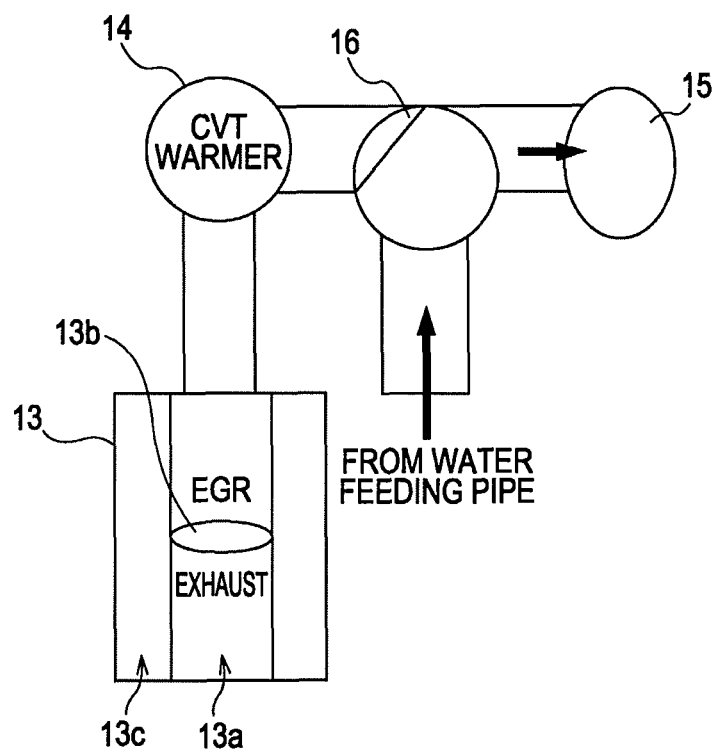
FIG. 4 is a schematic view illustrating the states of the EGR valve and the three-way valve upon the warm-up with the waste heat recovering and cooling apparatus for an engine according to the embodiment.

As illustrated in FIG. 4, the engine control unit makes the three-way valve 16 block the pipe at the exit of the CVR warmer 14 and allow the cooling water to pass from the water feeding pipe 7 to the heater core 15.

The engine control unit also closes the EGR valve 13b.

With this process, heat is prevented from transferring from the engine 1 to the transmission oil (CVT) via the CVT warmer 14. Further, since the cooling water accumulated from the EGR cooler 13 to the CVT warmer 14 is not circulated, the substantial volume of the circulated water is reduced. The EGR valve 13b is closed to lower the filling efficiency of the engine 1, whereby the combustion temperature is maintained high. Therefore, the temperature of the cooling water of the engine 1 is maintained high, and the releasing amount of heat from the heater core 15 is increased, whereby the heating performance is enhanced.

Thereafter, the engine control unit proceeds to step S06.

Step S06: Determine Temperature of Engine Cooling Water

The engine control unit detects the temperature of the cooling water of the engine 1. When the temperature is lower than 50° C., the engine control unit determines that the vehicle is in a state (cold state) before the warm-up (warm-up is unfinished) of the engine during a normal drive, and then, proceeds to step S07.

On the other hand, the temperature is 50° C. or higher, the engine control unit determines that the vehicle is in a state (warm state) after the warm-up of the engine during the normal drive, and then, proceeds to step S08.

Step S07: Close Three-Way Valve at Warmer Side and Open EGR Valve

Figure 5:
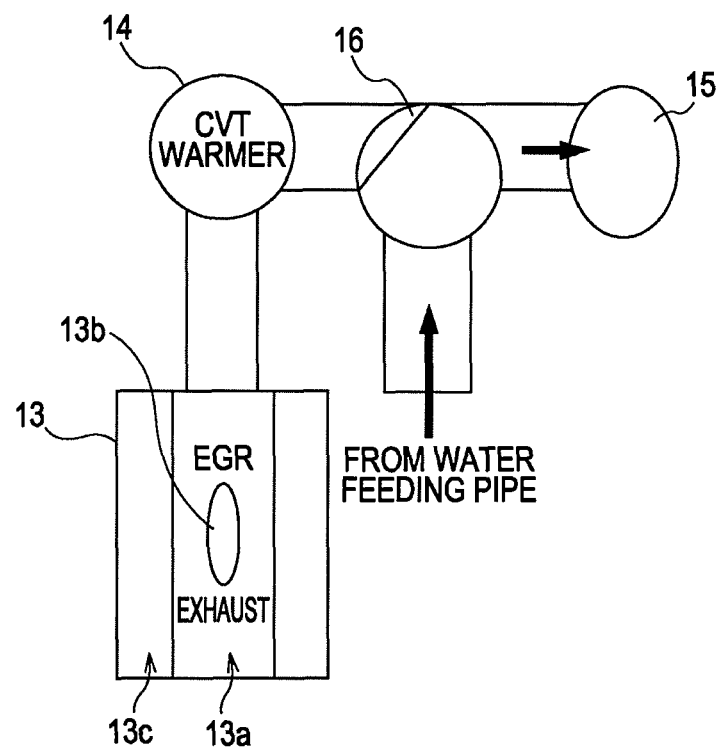
FIG. 5 is a schematic view illustrating the states of the EGR valve and the three-way valve before the end of the warm-up of the engine with the waste heat recovering and cooling apparatus for an engine according to the embodiment.

As illustrated in FIG. 5, the engine control unit makes the three-way valve 16 block the pipe at the exit of the CVT warmer 14 and allow the cooling water to pass from the water feeding pipe 7 to the heater core 15.

The engine control unit also opens the EGR valve 13b.

With this process, the early warm-up of the engine 1 is given priority so as to enhance fuel economy by reducing a friction of the engine 1.

The temperature of the cooling water accumulated from the EGR cooler 13 to the CVT warmer 14 is increased at an early stage by the waste heat recovery from the EGR gas, and the high-temperature cooling water is stored to prepare for the warm-up of the CVT after the warm-up of the engine 1.

In this case, control is performed such that the opening degree of the EGR valve is lowered immediately before the cooling water in the EGR cooler 13 reaches the boiling point, thereby maintaining the temperature of the cooling water not higher than the boiling point.

Thereafter, the engine control unit proceeds to step S09.

Step S08: Open Three-Way Valve at Warmer Side and Open EGR Valve

Figure 6:
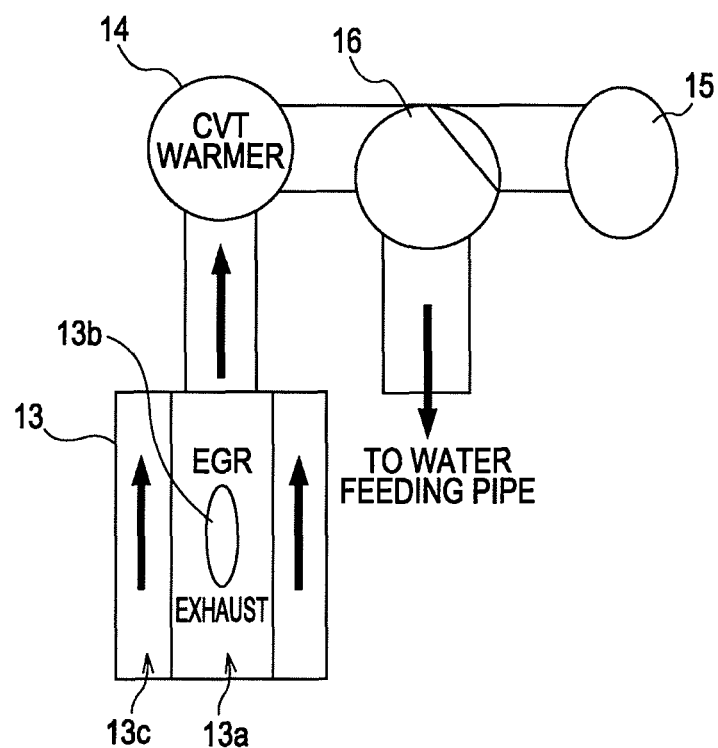
FIG. 6 is a schematic view illustrating the states of the EGR valve and the three-way valve after the end of the warm-up of the engine with the waste heat recovering and cooling apparatus for an engine according to the embodiment.

As illustrated in FIG. 6, the engine control unit makes the three-way valve 16 allow the cooling water to flow through the water feeding pipe 7 from the CVT warmer 14, and block the flow of the cooling water to the heater core 15.

The engine control unit also opens the EGR valve 13b.

With this process, the cooling water, whose temperature is increased by the waste heat recovery and which is stored in step S07, is allowed to pass through the CVT warmer 14 so as to increase the temperature of the transmission oil, whereby the warm-up effect of the CVT is maximized.

In the CVT, the viscosity of the transmission oil is lowered due to the increased temperature thereof, and the fuel efficiency of the vehicle is enhanced by the reduction in the torque loss.

Thereafter, the engine control unit proceeds to step S09.

<Step S09: Determine Whether Ignition is Off

The engine control unit detects whether the ignition switch is turned on or off. If the switch is turned off, the engine control unit ends a series of process.

When the switch is turned on, on the other hand, the engine control unit returns to step S02 so as to repeat the subsequent processes.

As described above, the present embodiment can provide a waste heat recovering and cooling apparatus for an engine that enhances fuel economy of a vehicle by utilizing waste heat of an engine with a simple configuration.

Modification

The present invention is not limited to the embodiment described above, but various modifications and changes are possible, and they are included in the technical scope of the present invention.

The engine to which the present invention is applied is not limited to the horizontal opposed engine as illustrated in the embodiment, but may be other engines such as in-line engine or V-type engine.

The structure of the channel of the cooling water is not limited to that in the embodiment. It may appropriately be changed.

For example, in the embodiment, a single three-way valve opens and closes the water channel of the EGR cooler and the CVT warmer, and opens and closes the water channel of the heater core. Alternatively, plural valves of another type may be used to achieve the functions.

Figure 7:
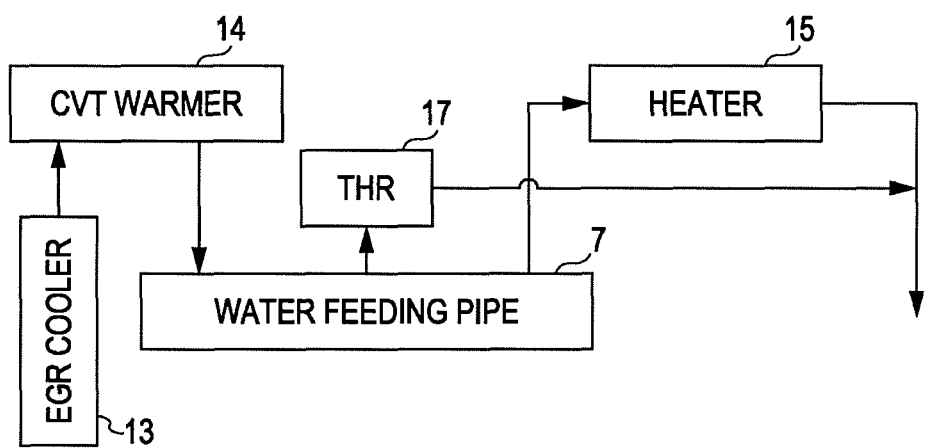
FIG. 7 is a view illustrating a modification of a waste heat recovering and cooling apparatus for an engine according to the present invention.

When only the increase in the temperature of the lubricating oil of the transmission by the waste heat recovery at the EGR cooler is required among the effects of the present invention, the CVT warmer only has to be arranged downstream of the EGR cooler, as illustrated in the modification of the present invention in FIG. 7. This modification is within the technical scope of the present invention. In FIG. 7, the components substantially similar to those in the above-mentioned embodiment are denoted by like numerals.

What is claimed is:

1. A waste heat recovering and cooling apparatus for an engine comprising:
   a water pump that ejects cooling water of an engine;
   an EGR cooler that cools EGR gas introduced into an intake pipe from an exhaust pipe of the engine by using some of the cooling water ejected from the water pump;
   an EGR valve that opens and closes the channel of the EGR gas passing through the EGR cooler;
   a transmission warmer that heats lubricating oil of a transmission by the cooling water passing through the EGR cooler;
   a blocking unit that blocks the water channel of the cooling water passing through the EGR cooler and the transmission warmer; and
   a control unit that controls the blocking unit and the EGR valve,
   wherein the blocking unit is a three-way valve that is connected to a pipe at an exit of the transmission warmer, a main cooling water channel of the engine, and a pipe at an inlet of a heater core used for warming a vehicle compartment, and the control unit closes the EGR valve, allows the three-way valve to communicate the main cooling water channel of the engine and the heater core with each other, and blocks the water channel of the cooling water passing through the EGR cooler and the transmission warmer, when a heating command is input from a user or upon a predetermined low-temperature state.

2. A waste heat recovering and cooling apparatus for an engine comprising:
a water pump that ejects cooling water of an engine;
an EGR cooler that cools EGR gas introduced into an intake pipe from an exhaust pipe of the engine by using some of the cooling water ejected from the water pump;
an EGR valve that opens and closes the channel of the EGR gas passing through the EGR cooler;
a transmission warmer that heats lubricating oil of a transmission by the cooling water passing through the EGR cooler;
a blocking unit that blocks the water channel of the cooling water passing through the EGR cooler and the transmission warmer; and
a control unit that controls the blocking unit and the EGR valve, and
wherein the control unit opens the EGR valve and brings the blocking unit into a blocking state when the engine is in a predetermined warm-up state.

3. The waste heat recovering and cooling apparatus for an engine according to claim 2, wherein the control unit opens the EGR valve and brings the blocking unit into an open state when the engine is in a predetermined warm-up end state.

4. The waste heat recovering and cooling apparatus for an engine according to claim 2, wherein the control unit closes the EGR valve and brings the blocking unit into an open state, when the transmission is in a predetermined high-temperature state.

5. The waste heat recovering and cooling apparatus for an engine according to claim 3, wherein the control unit closes the EGR valve and brings the blocking unit into an open state, when the transmission is in a predetermined high-temperature state.

6. The waste heat recovering and cooling apparatus for an engine according to claim 2, wherein the blocking unit is a three-way valve that is connected to a pipe at an exit of the transmission warmer, a main cooling water channel of the engine, and a pipe at an inlet of the heater core used for warming a vehicle compartment, and the control unit closes the EGR valve, allows the three-way valve to communicate the main cooling water channel of the engine and the heater core with each other, and blocks the water channel of the cooling water passing through the EGR cooler and the transmission warmer, when a heating command is input from a user or upon a predetermined low-temperature state.

7. The waste heat recovering and cooling apparatus for an engine according to claim 3, wherein the blocking unit is a three-way valve that is connected to a pipe at an exit of the transmission warmer, a main cooling water channel of the engine, and a pipe at an inlet of the heater core used for warming a vehicle compartment, and the control unit closes the EGR valve, allows the three-way valve to communicate the main cooling water channel of the engine and the heater core with each other, and blocks the water channel of the cooling water passing through the EGR cooler and the transmission warmer, when a heating command is input from a user or upon a predetermined low-temperature state.

8. The waste heat recovering and cooling apparatus for an engine according to claim 4, wherein the blocking unit is a three-way valve that is connected to a pipe at an exit of the transmission warmer, a main cooling water channel of the engine, and a pipe at an inlet of the heater core used for warming a vehicle compartment, and the control unit closes the EGR valve, allows the three-way valve to communicate the main cooling water channel of the engine and the heater core with each other, and blocks the water channel of the cooling water passing through the EGR cooler and the transmission warmer, when a heating command is input from a user or upon a predetermined low-temperature state.

9. The waste heat recovering and cooling apparatus for an engine according to claim 5, wherein the blocking unit is a three-way valve that is connected to a pipe at an exit of the transmission warmer, a main cooling water channel of the engine, and a pipe at an inlet of the heater core used for warming a vehicle compartment, and the control unit closes the EGR valve, allows the three-way valve to communicate the main cooling water channel of the engine and the heater core with each other, and blocks the water channel of the cooling water passing through the EGR cooler and the transmission warmer, when a heating command is input from a user or upon a predetermined low-temperature state.

10. A waste heat recovering and cooling apparatus for an engine comprising:
a water pump that ejects cooling water of an engine;
an EGR cooler that cools EGR gas introduced into an intake pipe from an exhaust pipe of the engine by using some of the cooling water ejected from the water pump;
an EGR valve that opens and closes the channel of the EGR gas passing through the EGR cooler;
a transmission warmer that heats lubricating oil of a transmission by the cooling water passing through the EGR cooler;
a blocking unit that blocks the water channel of the cooling water passing through the EGR cooler and the transmission warmer; and
a control unit that controls the blocking unit and the EGR valve, and
wherein the control unit opens the EGR valve and brings the blocking unit into an open state when the engine is in a predetermined warm-up end state.

11. The waste heat recovering and cooling apparatus for an engine according to claim 10, wherein the control unit closes the EGR valve and brings the blocking unit into an open state, when the transmission is in a predetermined high-temperature state.

12. The waste heat recovering and cooling apparatus for an engine according to claim 10, wherein the blocking unit is a three-way valve that is connected to a pipe at an exit of the transmission warmer, a main cooling water channel of the engine, and a pipe at an inlet of the heater core used for warming a vehicle compartment, and the control unit closes the EGR valve, allows the three-way valve to communicate the main cooling water channel of the engine and the heater core with each other, and blocks the water channel of the cooling water passing through the EGR cooler and the transmission warmer, when a heating command is input from a user or upon a predetermined low-temperature state.

13. The waste heat recovering and cooling apparatus for an engine according to claim 11, wherein the blocking unit is a three-way valve that is connected to a pipe at an exit of the transmission warmer, a main cooling water channel of the engine, and a pipe at an inlet of the heater core used for warming a vehicle compartment, and the control unit closes the EGR valve, allows the three-way valve to communicate the main cooling water channel of the engine and the heater core with each other, and blocks the water channel of the cooling water passing through the EGR cooler and the transmission warmer, when a heating command is input from a user or upon a predetermined low-temperature state.

14. A waste heat recovering and cooling apparatus for an engine comprising:
   a water pump that ejects cooling water of an engine;
   an EGR cooler that cools EGR gas introduced into an intake pipe from an exhaust pipe of the engine by using some of the cooling water ejected from the water pump;
   an EGR valve that opens and closes the channel of the EGR gas passing through the EGR cooler;
   a transmission warmer that heats lubricating oil of a transmission by the cooling water passing through the EGR cooler;
   a blocking unit that blocks the water channel of the cooling water passing through the EGR cooler and the transmission warmer; and
   a control unit that controls the blocking unit and the EGR valve, and
   wherein the control unit closes the EGR valve and brings the blocking unit into an open state, when the transmission is in a predetermined high-temperature state.

15. The waste heat recovering and cooling apparatus for an engine according to claim 14, wherein the blocking unit is a three-way valve that is connected to a pipe at an exit of the transmission warmer, a main cooling water channel of the engine, and a pipe at an inlet of the heater core used for warming a vehicle compartment, and the control unit closes the EGR valve, allows the three-way valve to communicate the main cooling water channel of the engine and the heater core with each other, and blocks the water channel of the cooling water passing through the EGR cooler and the transmission warmer, when a heating command is input from a user or upon a predetermined low-temperature state.

* * * * *